(12) United States Patent
Matsui et al.

(10) Patent No.: US 10,865,141 B2
(45) Date of Patent: Dec. 15, 2020

(54) SYNTHETIC QUARTZ GLASS LID PRECURSOR, SYNTHETIC QUARTZ GLASS LID, AND PREPARATION METHODS THEREOF

(71) Applicant: Shin-Etsu Chemical Co., Ltd., Tokyo (JP)

(72) Inventors: Harunobu Matsui, Joetsu (JP); Daijitsu Harada, Joetsu (JP); Masaki Takeuchi, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 342 days.

(21) Appl. No.: 15/883,575

(22) Filed: Jan. 30, 2018

(65) Prior Publication Data
US 2018/0215662 A1 Aug. 2, 2018

(30) Foreign Application Priority Data

Jan. 31, 2017 (JP) .................. 2017-015449

(51) Int. Cl.
C03C 27/04 (2006.01)
C03B 19/06 (2006.01)
(Continued)

(52) U.S. Cl.
CPC .......... *C03C 27/046* (2013.01); *C03B 19/066* (2013.01); *C03B 20/00* (2013.01); *C03C 3/06* (2013.01); *C03C 17/10* (2013.01); *C03C 17/40* (2013.01); *C03C 21/008* (2013.01); *C03C 27/00* (2013.01); *C03C 27/048* (2013.01); *C04B 37/045* (2013.01); *C03C 2217/256* (2013.01); *C03C 2217/268* (2013.01); *C03C 2217/27* (2013.01); *C03C 2217/77* (2013.01); (Continued)

(58) Field of Classification Search
None
See application file for complete search history.

(56) References Cited

U.S. PATENT DOCUMENTS 4,808,274 A * 2/1989 Nguyen .................. C03C 17/40
361/748
8,013,350 B2 9/2011 Itoi et al.
(Continued)

FOREIGN PATENT DOCUMENTS

JP 2008-219854 A 9/2008
JP 2015-18872 A 1/2015
(Continued)

OTHER PUBLICATIONS

Japanese Office Action, dated Sep. 3, 2019, for Japanese Application No. 2017-015449, with an English machine translation.

*Primary Examiner* — David Sample
(74) *Attorney, Agent, or Firm* — Birch, Stewart, Kolasch & Birch, LLP

(57) ABSTRACT

A synthetic quartz glass lid for use in optical device packages is prepared by furnishing a synthetic quartz glass lid precursor comprising a synthetic quartz glass substrate (1) and a metal or metal compound film (2), and forming a metal base adhesive layer (3) on the metal or metal compound film (2). The metal or metal compound film contains Ag, Bi, and at least one element selected from P, Sb, Sn and In.

11 Claims, 3 Drawing Sheets

(51) Int. Cl.
*C03B 20/00* (2006.01)
*C03C 3/06* (2006.01)
*C03C 17/06* (2006.01)
*C04B 37/04* (2006.01)
*C03C 27/00* (2006.01)
*C03C 17/40* (2006.01)
*C03C 17/10* (2006.01)
*C03C 21/00* (2006.01)

(52) U.S. Cl.
CPC ................ *C04B 2235/5454* (2013.01); *C04B 2237/125* (2013.01); *C04B 2237/343* (2013.01); *C04B 2237/366* (2013.01)

(56) References Cited

U.S. PATENT DOCUMENTS

| | | | | |
|---|---|---|---|---|
| 2001/0045573 | A1* | 11/2001 | Waitl | H01L 25/0753 257/205 |
| 2012/0091500 | A1* | 4/2012 | Matoba | H01L 33/486 257/99 |
| 2013/0206230 | A1* | 8/2013 | Sridharan | H01L 23/10 136/259 |
| 2015/0380330 | A1 | 12/2015 | Mitsui et al. | |

FOREIGN PATENT DOCUMENTS

| | | |
|---|---|---|
| JP | 2015-216322 A | 12/2015 |
| JP | 2016-27610 A | 2/2016 |

\* cited by examiner

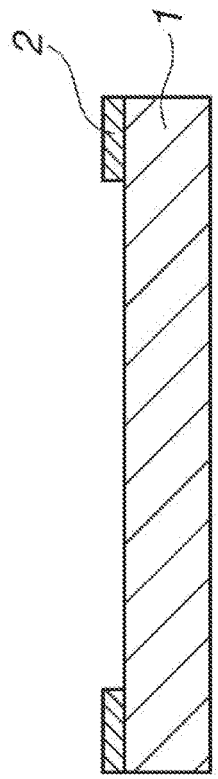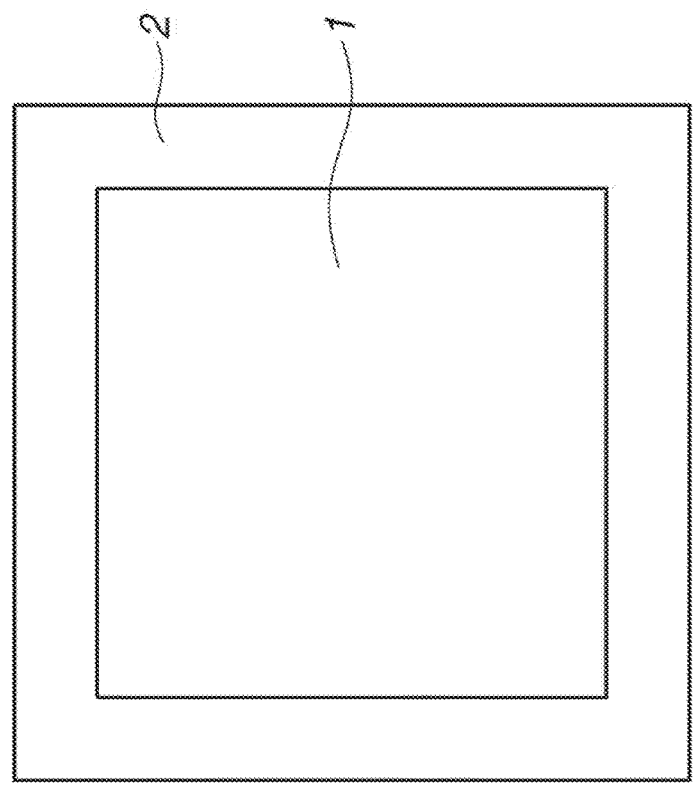
FIG.1A
FIG.1B

SYNTHETIC QUARTZ GLASS LID PRECURSOR, SYNTHETIC QUARTZ GLASS LID, AND PREPARATION METHODS THEREOF

CROSS-REFERENCE TO RELATED APPLICATION

This non-provisional application claims priority under 35 U.S.C. § 119(a) on Patent Application No. 2017-015449 filed in Japan on Jan. 31, 2017, the entire contents of which are hereby incorporated by reference.

TECHNICAL FIELD

This invention relates to synthetic quartz glass lids for use in optical device packages, synthetic quartz glass lid precursors, and methods for preparing the same. The glass lids are used in packages for optical devices, for example, UV-LEDs and laser light sources having an increased output of short wavelength light, such as ArF excimer laser, KrF excimer laser, and YAG FHG laser, especially optical devices capable of emitting UV band light, and specifically for providing a metal seal to receptacles having optical devices mounted therein.

BACKGROUND ART

As the use of mercury lamps is recently regulated, UV-LEDs capable of emitting short wavelength light, especially UV band light are regarded promising as the replacement. Since LEDs can produce light of arbitrary wavelength, LEDs of wavelength for a particular application are developed. For example, wavelength 265 nm in the UV region is known effective for breaking the DNA of bacteria. UV-LEDs adapted to emit light of wavelength 265 nm are developed for the sterilization application. Even when optical devices of 265 nm are in constant supply, it is difficult to use these devices without packaging.

In the packaging of optical devices capable of emitting long wavelength light in infrared band including LEDs, adhesives or resin moldings are necessary for bonding glass lids to receptacles having optical devices mounted therein. Typical adhesives or resin moldings include epoxy resins, acrylic resins, and glass frit.

For example, Patent Document 1 discloses bonding of a microlens using a UV-curable liquid acrylic resin or thermosetting resin adhesive. Patent Document 2 describes a method for preparing a composite package by bonding heterogeneous materials, i.e., ceramic and glass materials using glass fit. Patent Document 3 proposes to provide a window member with a metal layer at the periphery of its major surface and its side surfaces to enhance a sealing ability for thereby mitigating the stress applied to corners of the window member. Using this technique, hermetically sealed packages are obtained.

CITATION LIST

Patent Document 1: JP-A 2008-219854 (U.S. Pat. No. 8,013,350)
Patent Document 2: JP-A 2015-216322
Patent Document 3: JP-A 2015-018872

DISCLOSURE OF INVENTION

However, the method of Patent Document 1 using the UV-curable resin adhesive has the problem that upon continuous exposure to UV, the resin of which the adhesive is composed is excessively crosslinked, and the adhesive becomes brittle. Thus the adhesive is regarded less reliable when used in UV-band optical device packages. The method of Patent Document 2 requires a high-temperature step of sintering a glass frit layer for forming a fusion bond using laser, which can damage the optical device in the package. The method of Patent Document 3 has the problem that if the metal layer is stripped by impact, that is, if the metal layer at either of the major surface periphery and the side surface is broken, then the stress is not fully suppressed, allowing the overall seal to fail.

An object of the invention is to provide a synthetic quartz glass lid which is bonded to a receptacle having a UV-band optical device accommodated therein to construct an optical device package, wherein the lid maintains a stable bond over a long term, the bond is resistant to breakage even under a stress-applying environment, and the package ensures long-term stable service. Another object is to provide a synthetic quartz glass lid precursor, and methods for preparing the lid precursor and the lid.

The inventors have found that a metal or metal compound film containing silver, bismuth, and at least one element selected from among phosphorus, antimony, tin and indium is effectively bondable to synthetic quartz glass. A metal base adhesive layer is formed on the surface of the metal or metal compound film to yield a synthetic quartz glass lid. The synthetic quartz glass lid is joined to a receptacle having a UV-band optical device accommodated therein to form a metal bond, constructing an optical device package. The metal or metal compound film maintains a bond relative to a wide variety of metal base adhesives which bond is stable over a long term. Even under a stress-applying environment, the metal or metal compound film absorbs or mitigates the stress, preventing the bond from breakage or stripping.

Accordingly, in one aspect, the invention provides a synthetic quartz glass lid precursor comprising a synthetic quartz glass substrate and a metal or metal compound film on one major surface thereof, the metal or metal compound film containing silver, bismuth, and at least one element selected from the group consisting of phosphorus, antimony, tin and indium.

In a preferred embodiment, the metal or metal compound film is formed on an outer peripheral portion of the major surface of the substrate.

In a preferred embodiment, the metal or metal compound film has a thickness of 1 to 20 μm, a surface roughness (Ra) of up to 2 nm, and/or a flatness of up to 10 μm on its surface.

Typically, the lid precursor is used in optical device packages.

In another aspect, the invention provides a synthetic quartz glass lid comprising the lid precursor defined above and a metal base adhesive layer on the surface of the metal or metal compound film.

Preferably, the metal base adhesive layer contains at least one element selected from the group consisting of gold, silver, copper, palladium, tin, tungsten, and tellurium.

In a further aspect, the invention provides a method for preparing the synthetic quartz glass lid precursor defined above, comprising the steps of coating one major surface of a synthetic quartz glass substrate with a metal paste comprising silver, bismuth, and at least one element selected from the group consisting of phosphorus, antimony, tin and indium in a dispersing medium, and heating and sintering the metal paste coating to form the metal or metal compound film on the substrate.

Preferably, the metal paste has a silver content of 65 to 95% by weight.

In a still further aspect, the invention provides a method for preparing a synthetic quartz glass lid from the synthetic quartz glass lid precursor prepared by the above method, comprising the step of coating the surface of the metal or metal compound film with another metal paste to form a metal base adhesive layer thereon.

Preferably, the other metal paste contains at least one element selected from the group consisting of gold, silver, copper, palladium, tin, tungsten, and tellurium, and a dispersing medium.

Advantageous Effects of Invention

The synthetic quartz glass lid is joined to a receptacle having an optical device of short wavelength band, typically UV band, accommodated therein to form a metal bond, constructing an optical device package. The bond is stable over a long term. Even under a stress-applying environment, the bond is resistant to breakage. The lid ensures long-term stable service of the package. The synthetic quartz glass lid precursor is useful in the packaging of optical devices like UV-LEDs and DUV-LEDs which are promising replacements for mercury lamps. The synthetic quartz glass lid precursor is compatible with a wide variety of metal base adhesives when it is bonded to a receptacle of a different material from synthetic quartz glass. The bonding operation is easy.

BRIEF DESCRIPTION OF DRAWINGS

FIGS. 1A and 1B are cross-sectional and plan views of a synthetic quartz glass lid precursor in one embodiment of the invention, respectively.

DESCRIPTION OF PREFERRED EMBODIMENTS

Figure 2:
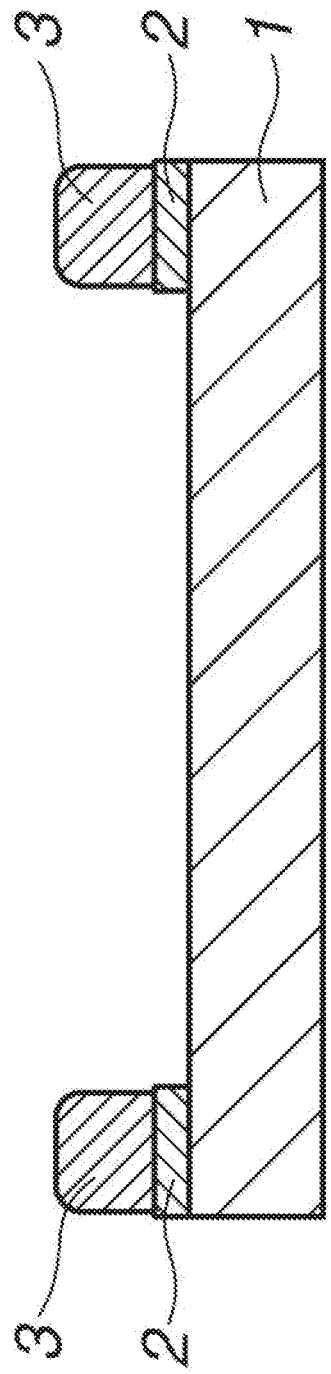
FIG. 2 is a cross-sectional view of a synthetic quartz glass lid in one embodiment of the invention.

As shown in cross-sectional and plan views of FIGS. 1A and 1B, the synthetic quartz glass lid precursor of the invention is defined as comprising a synthetic quartz glass substrate 1 and a metal or metal compound film 2 on one major surface thereof, preferably on an outer peripheral portion of the major surface of the substrate 1. Although the metal or metal compound film 2 may also be formed on side surfaces of the substrate 1 as well as the major surface, it is preferred that the metal or metal compound film 2 be formed only on one major surface of the substrate 1, especially on the major surface of the substrate 1 to abut against a receptacle. The metal or metal compound film 2 is preferably formed on an outer peripheral portion of the major surface of the substrate 1, as shown in FIGS. 1A and 1B, so that light may be extracted from a central area of the substrate 1, but need not necessarily be formed to the extreme periphery of the substrate 1. It suffices that the metal or metal compound film 2 is formed on the major surface of the substrate 1 in a shape and range sufficient to establish a hermetic seal and to leave an ample light-extraction area at the center of the substrate 1.

The synthetic quartz glass substrate may be of plate shape, spherical shape defining concave and convex surfaces, or non-spherical shape defining concave and convex surfaces. A substrate of plate shape is preferred from the standpoints of cost and easy handling, if it is used simply for the purpose of sealing a receptacle having an optical device accommodated therein. Where more efficient extraction of light from the optical device is desired, the spherical shape or non-spherical shape defining concave and convex surfaces, designed on the basis of optical analysis, such as simple planoconvex lens shape, planoconcave lens shape, or convex meniscus lens shape is preferred. Although the synthetic quartz glass substrate may have any appropriate thickness, it is preferred from the standpoint of the stress generated upon bonding that the thickness be at least 0.1 mm, more preferably at least 0.2 mm and up to 5 mm, more preferably up to 4 mm.

The metal film or metal compound film on the surface of the synthetic quartz glass substrate is formed of a highly UV resistant material and typically functions as a tough underlying layer that helps a metal base adhesive layer to form on synthetic quartz glass which is least wettable to metals. As a result, when the glass lid is bonded to a receptacle of heterogeneous material, the metal film or metal compound film functions to absorb or mitigate the stress generated from the synthetic quartz glass substrate having a different coefficient of thermal expansion from the metal or metal compound film, thus constructing a metal seal having improved hermeticity in that the metal or metal compound film is not stripped from the surface of the glass substrate. There are obtained packages suitable for optical devices of short wavelength, typically UV, which are stable over a long term.

It is generally known with respect to bonding between glass and metal that the bond strength depends on wettability. More particularly, glass based on covalent bonds and metal based on metallic bonds are incompatible because of different bond mode by nature. In the case of glass species containing metal element in their crystalline structure such as soda lime glass and borosilicate glass, it is contemplated to form a metal or metal compound film on glass surface by anodic bonding. However, anodic bonding is not applicable to synthetic quartz glass because it is an amorphous $SiO_2$ material free of such impurities as metal elements. It is thus difficult in most cases to form a metal or metal compound film on the surface of synthetic quartz glass. On the other hand, when a metal or metal compound film is formed on the surface of synthetic quartz glass using a conventional metal base adhesive such as solder or wax, the metal or metal compound film will strip from the interface in a hot or humid environment.

With the above discussion taken into account, the metal species in the metal or metal compound film is preferably a metal which is fully wettable to the surface of synthetic quartz glass substrate and uniformly bonds to the surface of synthetic quartz glass substrate without leaving gaps, to increase the tensile strength at the interface. In this sense, the metal or metal compound film should contain silver (Ag), bismuth (Bi), and at least one element selected from among phosphorus (P), antimony (Sb), tin (Sn) and indium (In).

The metal or metal compound film contains silver and bismuth as essential components. Due to its high ductility, silver is capable of absorbing or mitigating the stress induced during bonding to a heterogeneous material having a different coefficient of thermal expansion. In addition, silver is advantageous in that it is not an environmental load substance, is supplied in plenty, and available at relatively low cost. Bismuth has a low melting point of 271.3° C. by itself and a relatively low oxide forming free energy of −494 kJ/mol so that it is susceptible to oxidation. When it is bonded to synthetic quartz glass, a bond between oxides is formed, indicating tighter adhesion. From this standpoint, the metal compound film is preferably a metal oxide film.

For the reason that a metal material becomes more effective for absorbing or mitigating the stress induced in bonding synthetic quartz glass to a different member if the metal material is rendered flexible by creating voids in its crystalline structure, the metal or metal compound film should contain at least one element selected from the group consisting of phosphorus, antimony, tin and indium in addition to silver and bismuth. The metal or metal compound film may or may not contain another component. In the case of metal film, it may contain another metal element, but preferably consists of the foregoing five elements inclusive of silver and bismuth and exclusive of phosphorus and impurities (that is, consisting of silver, bismuth, and at least one element selected from antimony, tin and indium). In the case of metal compound film, it may contain another metal element and a light element(s) originating from the firing atmosphere gas such as carbon, oxygen, nitrogen and hydrogen. Where the metal compound film is a metal oxide film, oxygen is essential. From the standpoint of uniform shrinkage of the metal or metal compound film during its formation, specifically heating and sintering of a metal paste, the thickness of the metal or metal compound film is preferably at least 1 μm, more preferably at least 5 μm, and preferably up to 30 μm, more preferably up to 25 μm, even more preferably up to 20 μm. Notably, the thickness may be measured by a laser displacement sensor (for example, KS-1100 by Keyence Corp.).

The metal or metal compound film should preferably have a surface roughness (Ra) of up to 2 nm, more preferably up to 1.5 nm in order to provide a sufficient bonding ability. Notably, the surface roughness may be measured by a surface roughness meter (for example, Surfcom 480A by Tokyo Seimitsu Co., Ltd.).

The metal or metal compound film should preferably have a flatness of up to 10 μm, more preferably up to 6 μm at its surface for the reason that when a metal base adhesive is applied thereon, this flatness range is sufficient to prevent the metal base adhesive from flowing away from the film surface. Notably, the flatness may be measured by a stylus surface profilometer (for example, Alpha-Step D-600 by KLA Tencor Corp.).

The metal or metal compound film may be formed by furnishing a metal paste comprising silver, bismuth, and at least one element selected from phosphorus, antimony, tin and indium in a dispersing medium, applying the metal paste to the surface of the synthetic quartz glass substrate by means of a dispenser or by screen printing, and heating and sintering the metal paste coating. During the heating step, the dispersing medium will be removed by evaporation or combustion.

For the purpose of absorbing or mitigating the stress induced when the synthetic quartz glass lid is bonded to another member, the metal paste of which the metal or metal compound film is made should preferably have a silver content of at least 65% by weight, more preferably at least 70% by weight and up to 95% by weight, more preferably up to 85% by weight, even more preferably up to 80% by weight. For the purpose of making the metal or metal compound film as a tough underlying layer (on which a metal base adhesive layer may be formed) for enhancing adhesion, the metal paste should preferably have a bismuth content of at least 1% by weight, more preferably at least 5% by weight and up to 30% by weight, more preferably up to 25% by weight, even more preferably up to 20% by weight.

Further the metal paste should contain at least one element selected from phosphorus, antimony, tin and indium preferably in a content of at least 0.5% by weight, more preferably at least 1% by weight and up to 10% by weight, more preferably up to 5% by weight, even more preferably up to 3% by weight.

The dispersing medium is preferably an organic solvent. In order to prevent metal particles from agglomerating together in the metal paste and to form a uniform film by heating and sintering, the solvent is preferably selected from organic solvents having a large stereostructure and low polarity, such as naphthenic hydrocarbons and long chain alkyl alcohols of 8 to 12 carbon atoms. With the viscosity of the metal paste taken into account, the metal paste of which the metal or metal compound film is made should preferably contain the dispersing medium in a content of at least 3% by weight, more preferably at least 5% by weight and up to 25% by weight, more preferably up to 20% by weight.

In order that a metal or metal compound film having metal particles uniformly dispersed be formed by heating and sintering the metal paste, the metal particles in the metal paste should preferably have a primary particle size of at least 5 nm, more preferably at least 10 nm and up to 80 nm, more preferably up to 60 nm, even more preferably up to 40 nm. Notably, the primary particle size of metal particles may be measured by a particle size analyzer (e.g., ELSZ-1000ZS by Otsuka Electronics Co., Ltd.).

Since the metal paste is applied by means of a dispenser or by screen printing, the metal paste of which the metal or metal compound film is made should preferably have a viscosity at 20° C. of at least 100 Pa·s, more preferably at least 120 Pa·s, and up to 270 Pa·s, more preferably up to 200 Pa·s, even more preferably up to 160 Pa·s. Notably, the viscosity may be measured by a viscometer (e.g., digital handy viscometer TVC-7 by Toki Sangyo Co., Ltd.).

The metal paste coating is heated for sintering at a temperature of preferably at least 400° C., more preferably at least 430° C. and preferably up to 550° C., more preferably up to 500° C. The heat treatment time is typically 45 to 90 minutes. The atmosphere for the heat treatment may be air, inert gas or nitrogen gas. Particularly when a metal oxide film is formed, an oxygen gas-containing atmosphere, typically air is applicable.

Figure 3:
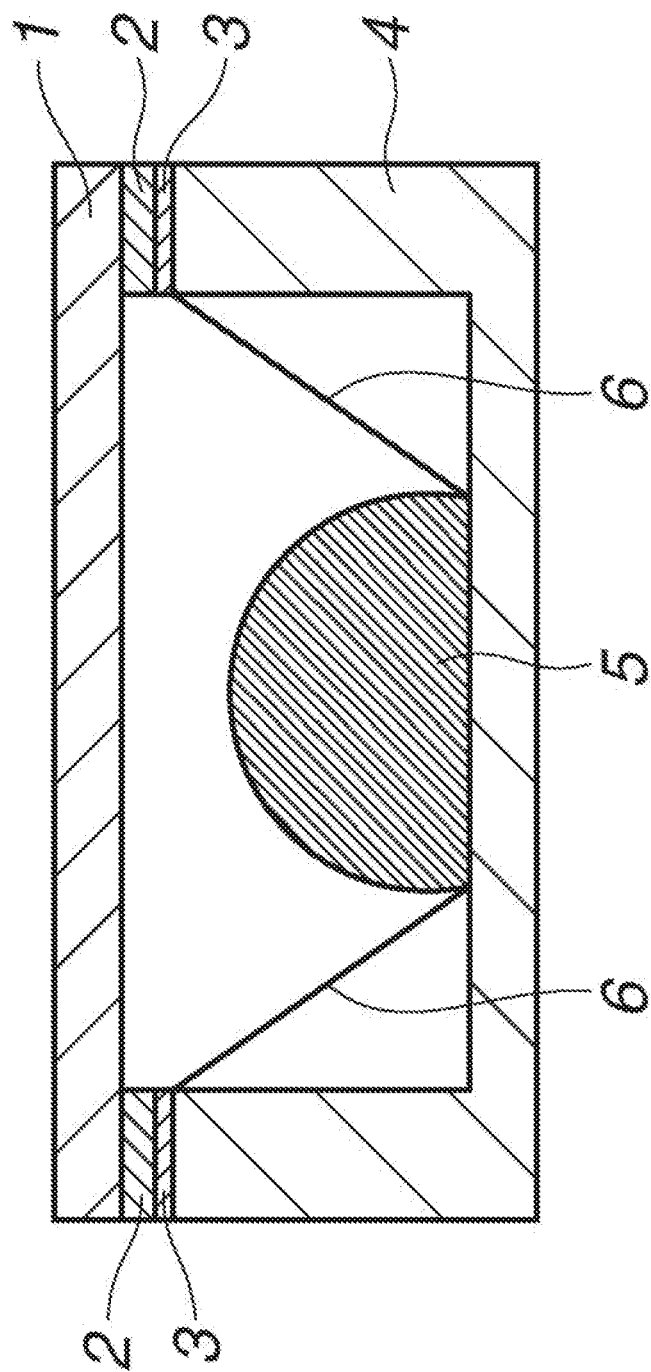
FIG. 3 is a cross-sectional view of an exemplary optical device package using the synthetic quartz glass lid of the invention.

The synthetic quartz glass lid precursor may be processed into a synthetic quartz glass lid by forming a metal base adhesive layer on the surface of the metal or metal compound film. As shown in FIG. 2, the synthetic quartz glass lid of the invention is defined as comprising a metal base adhesive layer 3 on the surface of the synthetic quartz glass substrate 1, specifically on the surface of the metal or metal compound film 2 which is formed on the outer peripheral portion of the major surface of the synthetic quartz glass substrate 1. On use of the synthetic quartz glass lid, as shown in FIG. 3, the synthetic quartz glass lid is bonded to a receptacle 4 having an optical device 5 accommodated therein, to construct an optical device package wherein a cavity for accommodating the optical device 5 is defined between the substrate 1 and the receptacle 4. A metal seal formed by the metal or metal compound film 2 and the metal base adhesive layer 3 establishes a hermetic seal. Also illustrated in FIG. 3 is a reflector 6.

Preferably the metal base adhesive layer 3 is fully wettable to the underlying film, i.e., metal or metal compound film and forms a metal bond therewith. When compatibility with the metal or metal compound film and a difference in coefficient of thermal expansion from the receptacle or the metal or metal compound film are taken into account, the metal base adhesive layer should preferably contain at least one element selected from the group consisting of gold, silver, copper, palladium, tin, tungsten, and tellurium. Particularly when compatibility with the metal of the metal or metal compound film is taken into account, one or more of silver, tin and tellurium are preferably contained. Most preferably silver is an essential component.

The metal base adhesive layer may be formed by furnishing a metal paste containing at least one element selected from among gold, silver, copper, palladium, tin, tungsten, and tellurium in a dispersing medium and applying the metal paste to the surface of the metal or metal compound film by means of a dispenser or by screen printing.

The metal paste of which the metal base adhesive layer is made should contain at least one element selected from gold, silver, copper, palladium, tin, tungsten, and tellurium preferably in a content of at least 80% by weight, more preferably at least 85% by weight and up to 95% by weight, more preferably up to 90% by weight. When compatibility with the underlying layer, i.e., metal or metal compound film and a difference in coefficient of thermal expansion between metal elements are taken into account, the metal paste should preferably contain silver in a proportion of preferably at least 50% by weight, more preferably at least 70% by weight and up to 100% by weight, more preferably up to 85% by weight, based on the total weight of at least one element selected from gold, silver, copper, palladium, tin, tungsten, and tellurium.

The dispersing medium is preferably an organic solvent. In order to prevent metal particles from agglomerating together in the metal paste and to form a uniform layer by heating, the solvent is preferably selected from organic solvents having a large stereostructure and low polarity, such as naphthenic hydrocarbons and long chain alkyl alcohols of 8 to 12 carbon atoms. With the viscosity of the metal paste taken into account, the metal paste of which the metal base adhesive layer is made should preferably contain the dispersing medium in a content of at least 3% by weight, more preferably at least 5% by weight and up to 20% by weight, more preferably up to 15% by weight.

In order to establish a tight bond between the adhesive layer and the metal or metal compound film, the metal particles in the metal paste for forming the adhesive layer should preferably be nano-particles, specifically have a primary particle size of at least 5 nm, more preferably at least 10 nm and up to 80 nm, more preferably up to 60 nm, even more preferably up to 40 nm. Notably, the primary particle size of metal particles may be measured by the same method as the metal particles in the metal paste for forming the metal or metal compound film.

The metal paste of which the metal base adhesive layer is made should preferably have a viscosity at 20° C. of at least 80 Pa·s, more preferably at least 120 Pa·s, even more preferably at least 150 Pa·s, and up to 300 Pa·s, more preferably up to 250 Pa·s, in order to apply the metal paste by means of a dispenser or by screen printing and to prevent the metal paste from flowing away from the surface of the metal or metal compound film. Notably, the viscosity may be measured by the same method as the metal paste for forming the metal or metal compound film. It is recommended that the metal paste be thixotropic when it has a low viscosity.

Although the metal base adhesive layer may have any appropriate thickness depending on the material of a receptacle to be bonded and the type of an optical device package, the thickness is preferably at least 10 μm, more preferably at least 20 μm, and up to 70 μm, more preferably up to 60 μm, even more preferably up to 50 μm. The thickness may be measured by the same method as the metal or metal compound film.

The metal base adhesive layer has a width which may be equal to the width of the metal or metal compound film. For the reason that in the step of bonding a glass lid to a receptacle, pressure is often applied for achieving proper alignment and bond therebetween, it is preferred that the width of the metal base adhesive layer be less than the width of the metal or metal compound film, specifically the width of the metal base adhesive layer be in a range of 80 to 95%, more preferably 85 to 95%, even more preferably 90 to 95% of the width of the metal or metal compound film.

In one embodiment, the metal paste may be applied to the surface of the metal or metal compound film on the synthetic quartz glass substrate to form a metal base adhesive layer thereon immediately before the glass lid is bonded to the receptacle having the optical device accommodated therein. In another embodiment wherein the metal base adhesive layer is previously formed on the surface of the metal or metal compound film, the metal paste may be applied to the surface of the metal or metal compound film and heated preferably at a temperature of 100 to 150° C. for 5 to 30 minutes into a semi-cured state (B-stage).

As is often the case with LEDs, the heat generated by an optical device accumulates or persists within the package to make the package interior hot, and consequently the optical device lowers its performance or emission efficiency. Therefore, when the optical device package is intended for higher outputs, the receptacle is preferably made of alumina base ceramics or aluminum nitride base ceramics having good heat dissipation, which may be surface metallized with gold or copper.

The optical device package is prepared as follows. The synthetic quartz glass lid having the metal base adhesive layer formed thereon is contacted and aligned with the receptacle having the optical device accommodated therein. In this state, heat is applied to bond the members together. This heat treatment (or cure) is preferably at a temperature of 150 to 280° C. for a time of 10 to 60 minutes, from the standpoint of heat resistance of the optical device. Pressure may be applied at the same time as heat treatment. The atmosphere for the heat treatment may be air, inert gas or nitrogen gas. In the case of the synthetic quartz glass lid in which the metal paste for forming the metal base adhesive layer is in the semi-cured state (B-stage), the adhesive layer is compressed or squeezed during heating and optional pressure so that metal particles in the adhesive layer are closely joined, establishing a fully hermetic seal.

The synthetic quartz glass lid precursor and the synthetic quartz glass lid are suited for use in optical device packages. Specifically, the precursor and the lid are suited for use in packages for mounting optical devices capable of emitting light in a wavelength range of preferably up to 400 nm, more preferably up to 350 nm, and even more preferably up to 300 nm, for example, UV light in UV-A, UV-B and UV-C ranges. Examples of the optical device capable of emitting light in a wavelength range of up to 400 nm include UV-LED, DUV-LED, ArF excimer laser, KrF excimer laser, and YAG FHG laser.

EXAMPLE

Examples of the invention are given below by way of illustration and not by way of limitation.

Example 1

A synthetic quartz glass wafer (diameter 4 inches=~101.6 mm, thickness 0.2 mm) as sliced was lapped on a double-side lapping machine of planetary motion and mirror polished on a double-side polishing machine of planetary motion, yielding a synthetic quartz glass substrate.

A metal paste was prepared by dispersing 70 wt % of silver with a primary particle size of 5-20 nm, 10 wt % of bismuth with a primary particle size of 15-40 nm, and 2 wt % of tin with a primary particle size of 20-40 nm in 18 wt % of 1-decanol as dispersing medium. The metal paste in which metal particles of nano size were dispersed had a viscosity of 140 Pa·s at 20° C. The metal paste was applied to an outer peripheral portion of the major surface of the synthetic quartz glass substrate by screen printing through a screen mask which was designed to a window frame pattern, thereby forming a metal paste coating having a line width of 400 μm and a thickness of 10 μm. The metal paste-coated glass substrate was held in an electric furnace of air atmosphere at 450° C. for 60 minutes whereby the metal paste coating was heated and sintered into a metal oxide film, yielding a synthetic quartz glass lid precursor. The metal oxide film on the precursor had a surface roughness (Ra) of 1.4 nm and a flatness of 4.8 μm.

Another metal paste was prepared by dispersing 80 wt % of silver with a primary particle size of 5-15 nm and 10 wt % of tin with a primary particle size of 20-35 nm in 10 wt % of 1-octanol as dispersing medium. The other metal paste in which metal particles of nano size were dispersed had a viscosity of 100 Pa·s at 20° C. The other metal paste was applied to the metal oxide film by screen printing to form a metal base adhesive layer having a line width of 350 μm and a thickness of 30 μm. The synthetic quartz glass substrate having the metal base adhesive layer formed thereon was heated in air atmosphere on a hot plate at 130° C. for 20 minutes to bring the metal base adhesive layer to the semi-cured state (B-stage). The substrate was cut by dicing, obtaining a synthetic quartz glass lid of 3.5 mm squares.

A LED optical device capable of emitting light of wavelength 265 nm was mounted in a receptacle of aluminum nitride ceramic. The glass lid at its metal base adhesive layer was mated with the receptacle. They were heated at 250° C. and pressed under a load of 3.5 kgf/cm$^2$ (~0.34 MPa) for 40 minutes to bond the lid to the receptacle, obtaining a metal-sealed optical device package.

The optical device package was examined by repeating a hot humid test 5 cycles, the test including heating the package in an oven at 300° C. for 20 minutes and holding the package in a constant temperature/humidity tank of 85° C./85% RH for 1 week. Neither stripping of the metal base adhesive layer (due to the stress of the aluminum nitride ceramic or quartz glass) nor dew condensation within the package were found, demonstrating that the metal seal maintained hermeticity. The LED optical device was operated to emit light of wavelength 265 nm over 3,000 hours, after which the metal base adhesive layer was not damaged at all. It was demonstrated that the metal seal maintained hermeticity and the package using the synthetic quartz glass lid remained stable relative to the optical device of short wavelength.

Example 2

A synthetic quartz glass wafer (diameter 6 inches=~152.4 mm, thickness 0.5 mm) as sliced was lapped on a double-side lapping machine of planetary motion and mirror polished on a double-side polishing machine of planetary motion, yielding a synthetic quartz glass substrate.

A metal paste was prepared by dispersing 85 wt % of silver with a primary particle size of 10-25 nm, 5 wt % of bismuth with a primary particle size of 15-30 nm, and 3 wt % of antimony with a primary particle size of 20-40 nm in 7 wt % of naphthenic hydrocarbon (AF Solvent #4 by JX Oil & Energy Corp.) as dispersing medium. The metal paste in which metal particles of nano size were dispersed had a viscosity of 250 Pa·s at 20° C. The metal paste was applied to an outer peripheral portion of the major surface of the synthetic quartz glass substrate by means of a dispenser through a screen mask which was designed to a window frame pattern, thereby forming a metal paste coating having a line width of 300 μm and a thickness of 20 μm. The metal paste-coated glass substrate was held in an electric furnace of inert gas atmosphere at 450° C. for 60 minutes whereby the metal paste coating was heated and sintered into a metal film, yielding a synthetic quartz glass lid precursor. The metal film on the precursor had a surface roughness (Ra) of 1.3 nm and a flatness of 5.4 μm.

Another metal paste was prepared by dispersing 70 wt % of silver with a primary particle size of 10-30 nm, 15 wt % of copper with a primary particle size of 15-35 nm, and 10 wt % of tellurium with a primary particle size of 25-40 nm in 5 wt % of 1-decanol as dispersing medium. The other metal paste in which metal particles of nano size were dispersed had a viscosity of 120 Pa·s at 20° C. The other metal paste was applied to the metal film by means of a dispenser to form a metal base adhesive layer having a line width of 280 μm and a thickness of 25 μm. The synthetic quartz glass substrate having the metal base adhesive layer formed thereon was heated in air atmosphere on a hot plate at 150° C. for 10 minutes to bring the metal base adhesive layer to the semi-cured state. The substrate was cut by dicing, obtaining a synthetic quartz glass lid of 3.4 mm squares.

A LED optical device capable of emitting light of wavelength 280 nm was mounted in a receptacle of alumina ceramic. The glass lid at its metal base adhesive layer was mated with the receptacle. They were heated at 270° C. and pressed under a load of 3.0 kgf/cm$^2$ (~0.29 MPa) for 60 minutes to bond the lid to the receptacle, obtaining a metal-sealed optical device package.

The optical device package was examined by repeating a hot humid test 5 cycles, the test including heating the package in an oven at 300° C. for 20 minutes and holding the package in a constant temperature/humidity tank of 85° C./85% RH for 1 week. Neither stripping of the metal base adhesive layer (due to the stress of the alumina ceramic or quartz glass) nor dew condensation within the package were found, demonstrating that the metal seal maintained hermeticity. The LED optical device was operated to emit light of wavelength 280 nm over 3,000 hours, after which the metal base adhesive layer was not damaged at all. It was demonstrated that the metal seal maintained hermeticity and the package using the synthetic quartz glass lid remained stable relative to the optical device of short wavelength.

Japanese Patent Application No. 2017-015449 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A synthetic quartz glass lid precursor comprising a synthetic quartz glass substrate and a metal or metal compound film on one major surface thereof, the metal or metal compound film containing silver, bismuth, and at least one element selected from the group consisting of phosphorus, antimony, tin and indium, wherein
the metal or metal compound film has a surface roughness (Ra) of up to 2 nm.

2. The lid precursor of claim 1 wherein the metal or metal compound film is formed on an outer peripheral portion of the major surface of the substrate.

3. The lid precursor of claim 1 wherein the metal or metal compound film has a thickness of 1 to 20 μm.

4. The lid precursor of claim 1 wherein the metal or metal compound film has a flatness of up to 10 μm on its surface.

5. The lid precursor of claim 1 which is used in optical device packages.

6. A synthetic quartz glass lid comprising the lid precursor of claim 1, and a metal base adhesive layer on the surface of the metal or metal compound film.

7. The lid of claim 6 wherein the metal base adhesive layer contains at least one element selected from the group consisting of gold, silver, copper, palladium, tin, tungsten, and tellurium.

8. A method for preparing the synthetic quartz glass lid precursor of claim 1, comprising the steps of:

coating one major surface of a synthetic quartz glass substrate with a metal paste comprising silver, bismuth, and at least one element selected from the group consisting of phosphorus, antimony, tin and indium in a dispersing medium, and heating and sintering the metal paste coating to form the metal or metal compound film on the substrate.

9. The method of claim 8 wherein the metal paste has a silver content of 65 to 95% by weight.

10. A method for preparing a synthetic quartz glass lid from the synthetic quartz glass lid precursor prepared by the method of claim 8, the method comprising the step of coating the surface of the metal or metal compound film with another metal paste to form a metal base adhesive layer thereon.

11. The method of claim 10 wherein the other metal paste contains at least one element selected from the group consisting of gold, silver, copper, palladium, tin, tungsten, and tellurium, and a dispersing medium.

* * * * *